United States Patent
Ji et al.

(10) Patent No.: US 11,834,784 B2
(45) Date of Patent: Dec. 5, 2023

(54) METHOD FOR PREPARING UNBLEACHED BIOMECHANICAL PULP AND FULLY UTILIZING BY-PRODUCTS BY TREATING STRAWS WITH HEAT STEAM IN SYNERGY WITH BIOLOGICAL ENZYME

(71) Applicant: Qilu University of Technology, Jinan (CN)

(72) Inventors: Xingxiang Ji, Jinan (CN); Jiachuan Chen, Jinan (CN); Zhongjian Tian, Jinan (CN); Ruiming Wang, Jinan (CN); Dongxing Wang, Jinan (CN); Yu Liu, Jinan (CN)

(73) Assignee: Qilu University of Technology, Jinan (CN)

( * ) Notice: Subject to any disclaimer, the term of this patent is extended or adjusted under 35 U.S.C. 154(b) by 11 days.

(21) Appl. No.: 17/561,347

(22) Filed: Dec. 23, 2021

(65) Prior Publication Data
US 2022/0205178 A1    Jun. 30, 2022

(30) Foreign Application Priority Data
Dec. 31, 2020    (CN) .......................... 202011639128.4

(51) Int. Cl.
*D21C 5/00*    (2006.01)
*D21H 11/08*    (2006.01)
*D21H 11/12*    (2006.01)

(52) U.S. Cl.
CPC .............. *D21C 5/005* (2013.01); *D21H 11/08* (2013.01); *D21H 11/12* (2013.01)

(58) Field of Classification Search
CPC ........ D21C 5/005; D21C 9/004; D21C 9/007; D21C 9/002; D21C 1/02; D21C 1/06; D21H 11/08; D21H 11/12; D21H 11/18; D21H 27/00; D21H 27/10; Y02P 70/10; C05B 17/00; C05G 5/12
See application file for complete search history.

(56) References Cited

U.S. PATENT DOCUMENTS

2011/0061825 A1* 3/2011 Li ............................ D21C 5/00
162/13

FOREIGN PATENT DOCUMENTS

| CN | 101787656 A | * | 7/2010 | ............. D21C 11/00 |
| CN | 101787656 A |   | 7/2010 |   |
| CN | 109680530 A | * | 4/2019 | ............... D21B 1/02 |
| CN | 109680530 A |   | 4/2019 |   |

OTHER PUBLICATIONS

General Office of the State Council of the People's Republic of China, "Notice of the General Office of the State Council on Printing and Distributing the Implementation Plan for Prohibiting the Entry of Foreign Garbage and Promoting the Reform of the Solid Waste Import Management System," release date Jul. 27, 2017, available at https://www.gov.cn/zhengce/content/2017-07/27/content_5213738.htm.

* cited by examiner

*Primary Examiner* — Eric Hug
*Assistant Examiner* — Matthew M Eslami
(74) *Attorney, Agent, or Firm* — FLENER IP & BUSINESS LAW; Zareefa B. Flener

(57) ABSTRACT

The present disclosure relates to a method for preparing an unbleached biomechanical pulp and fully utilizing by-products by treating wheat straws with heat steam in synergy with biological enzymes, which belongs to the technical field of papermaking technology and waste comprehensive utilization. The present disclosure provides a method for preparing an unbleached biomechanical pulp by treating whole wheat straws with heat steam in synergy with biological enzymes, where the prepared high-strength biomechanical pulp can meet the requirements of producing unbleached packaging paper and paper-based materials. At the same time, the by-products are recycled to prepare a biomass compound fertilizer, which turns solid waste into treasure and realizes the high-value full utilization of wheat straw. Therefore, the method in the present disclosure is simple, green, clean and efficient, which has good practical application value and broad application prospects.

7 Claims, No Drawings

METHOD FOR PREPARING UNBLEACHED BIOMECHANICAL PULP AND FULLY UTILIZING BY-PRODUCTS BY TREATING STRAWS WITH HEAT STEAM IN SYNERGY WITH BIOLOGICAL ENZYME

CROSS REFERENCE TO RELATED APPLICATION

This patent application claims the benefit and priority of Chinese Patent Application No. 202011639128.4 filed on Dec. 31, 2020, the disclosure of which is incorporated by reference herein in its entirety as part of the present application.

TECHNICAL FIELD

The present disclosure belongs to the technical field of papermaking technology and waste comprehensive utilization, and in particular relates to a method for preparing an unbleached biomechanical pulp and fully utilizing by-products by treating wheat straws with heat steam in synergy with biological enzymes.

BACKGROUND ART

Disclosure of the background art is only intended to increase the understanding of the overall background of the present disclosure, and is not necessarily regarded as an admission or suggestion in any form that the information has become the prior art known to those of ordinary skill in the art.

The papermaking industry is not only a consumer goods industry, but also an important basic raw material industry, involving many fields such as life, culture and education, industry and agriculture, national defense and aviation. In 2016, pulp imports reached 21.06 million tons, and waste paper imports reached 28.5 million tons in China. The degree of dependence on the import of papermaking fiber raw materials was close to 50%. The large waste paper imports made up the deficiency in fiber raw materials in China and supported the development of the papermaking industry. In April 2017, the Central Government of China issued "The latest progress of prohibiting import of the foreign waste, Progress on the implementation of the reform of the import management system for solid waste", which clearly stipulates that from 2021, China will ban the import of unsorted waste paper. China is facing a serious shortage of papermaking raw materials.

In traditional pulping and papermaking, wheat straw, as a representative of grasses, is an important papermaking raw material. However, because wheat straw leaves and sheaths are not easy to be pulped, in the preparation process, only wheat straw stalk is usually retained, and wheat straw leaves and sheaths are required to be removed as much as possible. However, the removal of wheat straw leaves and sheaths not only increases the cost of preparing materials, but also greatly reduces the utilization rate of wheat straw raw materials. Therefore, the applicant proposed a method for preparing biomechanical pulp from whole waste wheat straw by treating with heat steam in synergy with biological enzymes. The waste wheat straws after obtaining wheat grains, including wheat straw stalks, leaves and sheaths, were collected and treated with hot water steam in synergy with biological enzymes to prepare an unbleached biomechanical pulp (see CN 109680530 A). However, the problem of by-products produced in the pulping process has not been well resolved, which is not conducive to the comprehensive high-value utilization of agricultural straw.

SUMMARY

In terms of the background art, the present disclosure provides a method for preparing an unbleached biomechanical pulp by treating whole wheat straws with heat steam in synergy with biological enzymes, where the prepared high-strength biomechanical pulp can meet the requirements of producing unbleached packaging paper and paper-based materials. At the same time, the by-products are recycled to prepare a biomass compound fertilizer, which turns solid waste into treasure and realizes the high-value full utilization of wheat straw. Therefore, the method in the present disclosure is simple, green, clean and efficient, which has good practical application value and broad application prospects.

The specific technical schemes are as follows:

According to a first aspect of the present disclosure, a method for preparing an unbleached biomechanical pulp and fully utilizing by-products by treating wheat straws with heat steam in synergy with biological enzyme is provided, which comprises the following steps:

(1) Taking a waste wheat straw after obtaining wheat grains as a raw material, mixing the wheat straw according to a liquor ratio of 1:3-1:8, adding KOH to adjust the pH value of the wheat straw containing water to 10-14, and then introducing hot water steam with a temperature of 100-120° C. for hot water steam treatment for 15-60 min; collecting the lye wastewater, and collecting the rotten leaves and straw that cannot be processed and used;

(2) After the hot water steam treatment, rubbing the wheat straws with a straw rubbing filament machine to make them fibrillated; collecting the waste water produced in the stage of screw extrusion;

(3) Treating the fibrillated wheat straw with alkaline biological compound enzymes at 40-60° C. for 30-90 min; and collecting the wastewater generated in the enzyme treatment stage;

(4) Refining the wheat straw after biological treatment;

Evaporating and concentrating the lye wastewater, wastewater generated in the straw rubbing stage, wastewater generated in the enzyme treatment stage, and washing water of refining by a multi-purpose evaporator to obtain a residue, and recovering the heat energy for the hot water steam treatment of step (1); mixing the residue with the rotten leaves and straw that cannot be processed and used in step (1), and adjusting the pH to make a fertilizer.

According to a second aspect of the present disclosure, a mechanical pulp and/or fertilizer prepared by the method described in above technical schemes are provided.

According to a third aspect of the present disclosure, an application of the above mechanical pulp in the preparation of sack paper and/or an application of the above fertilizer in promoting the growth of crops are provided.

The present disclosure has the following beneficial effects:

By using wheat straw waste as raw materials, and using biotechnology and mechanical methods, the above technical scheme has developed a preparation method of biomechanical pulp under the condition of ensuring the recycling of papermaking wastewater, not increasing the discharge of wastewater and not causing environmental pollution, which largely solves the shortage of papermaking fiber raw materials. At the same time, agricultural residues can be used with high added value, which can be effectively connected with the "three rural" issues, eliminate the incineration of crop waste from the source, and achieve a double harvest of economic and social benefits.

In view of the actual situation of removing wheat straw leaves from wheat straw and using only wheat straw stalks in the traditional pulping and papermaking process, for the whole wheat straw wastes (wheat straw stalks, leaves and sheaths), the present disclosure proposes for the first time the full utilization of wheat harvesting wastes, and puts forward new concepts of softening by hydrothermal saturation and unbleached biomechanical pulp; for the first time, a new method for preparing a high-strength unbleached biomechanical pulp by hot steam in synergy with alkaline compound biological enzymes is proposed. Compared with the traditional mechanical pulp, this technology can save more than 40% of the energy consumption of refining, and all physical indicators have reached the requirements for the production of packaging paper and paper-based materials. Especially, it has a relatively wide range of applications in the unbleached packaging sack paper.

In the above technical scheme, the crop wheat waste is used as the raw material for pulping, the wheat straw is treated with atmospheric hot water steam, and at the same time, a trace amount of alkali is added to adjust the pH value of the wheat straw containing water to 10-14, after parts of hemicellulose, lignin, pectin and other substances are dissolved out from the wheat straw, the wheat straw is softened by hydrothermal saturation, and then it is rubbed with straw rubbing filament machines into fibrillation, and then subjected to biological enzyme treatment. After the biological enzyme treatment, the fiber is further softened, and then the wheat straw is refined, where the prepared biomechanical pulp can meet the requirements of producing unbleached packaging paper and paper-based materials. Especially, it has a relatively wide range of applications in the unbleached packaging sack paper.

In the above technical scheme, the wastewater produced in each stage is treated by a multi-purpose evaporator, and while the solid residue is recovered, the pH value is adjusted with a trace amount of phosphoric acid, and then granulated to make a biomass compound fertilizer. The fertilizer contains an appropriate amount of K, P element and a large number of easily degradable, small-grained straw components (such as hemicellulose, etc.), the entire production process is green and environmentally friendly, and the high-value and full utilization of wheat straw is realized. It should be noted that, unlike the traditional fertilizer preparation based on by-products of chemical pulp (chemical pulp requires high temperature and high alkalinity, the general temperature is above 160° C., and the amount of alkali used is about 20%), the technical scheme of the application adopts a low-temperature and alkali-less method, and the straw used therein is a good material for natural potash fertilizer. Therefore, the technical scheme of the application naturally has "innate advantages" in fertilizer preparation. At the same time, after optimizing and screening the process conditions, the biomass compound fertilizer prepared by the application also has the advantages of high fertilizer efficiency and good storage stability.

In summary, the method in above technical schemes is simple, energy conservation and environmentally friendly, conforms to the national industrial policies for resource conservation, economic circulation, energy conservation and emission reduction, and can produce good social, economic and ecological benefits, which has good practical application value and prospects for industrial applications.

DETAILED DESCRIPTION OF THE EMBODIMENTS

It should be noted that the following detailed description is exemplary and is intended to provide a further description of the present disclosure. All technical and scientific terms used herein have the same meaning as commonly understood by one of ordinary skill in the art to which the present disclosure belongs, unless otherwise indicated.

It is to be noted that the terminology used herein is for the purpose of describing particular embodiments, and is not intended to limit the exemplary embodiments of the present disclosure. As used herein, the singular terms are also intended to include the plural, and it is also to be understood that when the terms "include" and/or "comprise" are used in the specification, they indicate the presence of features, steps, operations and/or combinations thereof, unless otherwise indicated.

In the present disclosure, the liquor ratio refers to the cooking liquor ratio of the raw material, and the liquor ratio:the ratio of the weight of the cooking absolutely dry raw material to the total cooking liquid volume.

In a first embodiment of the present disclosure, a method for preparing an unbleached biomechanical pulp and fully utilizing by-products by treating wheat straws with heat steam in synergy with biological enzyme is provided, which comprises the following steps:

(1) Taking a waste wheat straw after obtaining wheat grains as a raw material, mixing the wheat straw according to a liquor ratio of 1:3-1:8, adding KOH to adjust the pH value of the wheat straw containing water to 10-14, and then introducing hot water steam with a temperature of 100-120° C. for hot water steam treatment for 15-60 min; collecting the lye wastewater, and collecting the rotten leaves and straw that cannot be processed and used;

(2) After the hot water steam treatment, rubbing the wheat straws with straw rubbing filament machines to make them fibrillated; collecting the waste water produced in the stage of screw extrusion;

(3) Treating the fibrillated wheat straw with alkaline biological compound enzymes at 40-60° C. for 30-90 min; and collecting the wastewater generated in the enzyme treatment stage;

(4) Refining the wheat straw after biological treatment;

Evaporating and concentrating the lye wastewater, wastewater generated in the straw rubbing stage, wastewater generated in the enzyme treatment stage, and washing water of refining by a multi-purpose evaporator to obtain a residue, and recovering the heat energy for the hot water steam treatment of step (1); mixing the residue with the rotten leaves and straw that cannot be processed and used in step (1), and adjusting the pH to make a fertilizer.

In step (1), the waste wheat straw is cut into a ready-for-use raw material having a length of 3-6 cm, and air-dried.

In step (1), the liquor ratio is 1:3-1:8 (g/mL). It has been verified and analyzed by experiments that the solution with this liquor ratio can form wheat straw suspension with a specific pH after a certain period of time, thereby making the pH of the prepared biomechanical pulp be neutral.

In step (1), the wheat straw is specially treated with hot steam to make the fiber of the wheat straw softer. It has been verified by experiments that compared with other methods, it can prepare sack paper with better comprehensive strength and greatly reduce the cost of unbleached packaging paper.

In step (1), KOH is added to adjust the pH of the wheat straw containing water to 10-14. The purpose of adding KOH is as follows: on the one hand, it can make a small part of hemicellulose, lignin and pectin dissolve out from wheat straws, and on the other hand, it can assist the hot steam to soften the wheat straw as quickly as possible, and serve as the basis for the next step of straw rubbing and fibrillating; more importantly, since potassium is a large element necessary for plants, potash treatment is used here to make the subsequent fertilizers rich in potassium.

In step (1), the hot steam treatment temperature is 100-120° C., and the time is 15-60 min. It has been verified by experiments that if the temperature is too low, the whole wheat straw waste cannot be effectively softened by absorbing water, which will affect the subsequent fibrillating effect.

In step (2), a straw rubbing filament machine is used to physically fibrillate, and the process conditions are as follows: the compression ratio of rubbing is controlled to 1:1-1:4.

Using a straw rubbing filament machine to treat the wheat straw that has been softened by hydrothermal saturation can not only enable the wheat straw to achieve a good fibrillating effect, but also significantly improve the efficiency of refining. More importantly, the inventor found in the process of experimental research that compared with spiral extrusion into filaments, the use of a straw rubbing filament machine to fibrillate has better effects, while the effects of extrusion and shearing are weaker, which makes the wheat straw fiber suffer less damage, so that the final paper has better tensile properties. Tests have verified that this technology is more suitable for preparing unbleached packaging sack paper with higher tensile strength.

In step (3), the liquor ratio is controlled at 1:3-8 (g/mL).

For the particular wheat straw waste raw material after extrusion, the selected alkaline biological compound enzyme is a compound enzyme of alkaline xylanase, alkaline cellulase, and alkaline pectinase, and the total dosage is 10-60 IU/mL, the ratio of enzyme activity of the alkaline xylanase, alkaline cellulase and alkaline pectinase is (0-5): (0-4):(0-1.5), and the amount of each enzyme is not 0; preferably (3-4):(2-3):1.5; preferably, the total dosage of enzymes is 50-55 IU/mL. Applicants have accidentally discovered that by optimizing the ratio of enzyme activity of the biological compound enzyme, while ensuring the high performance of pulping, it can also be combined with the added amount of wastewater to effectively improve the fertilizer efficiency and storage stability of the fertilizer.

In step (4), the number of refining is determined according to production needs, and the beating degree of refining is controlled at 25-50° SR.

The refining conditions are as follows: using a KPF series high-concentration disc refiner for high-concentration refining in one or two stages with a spindle speed of 3000-4000 r/min, and a refining gap of 0.15-0.5 mm.

Wherein, the wastewater generated in the straw rubbing stage, the wastewater generated in the enzyme treatment stage, and the washing water of refining is 10-15:1-3:20-25: 10-15;

The mass ratio of the residue to the rotten leaves and straw that cannot be processed and used in step (1) is 3-5:1-2;

The process of adjusting the pH to make the fertilizer is as follows: adding phosphoric acid to adjust the pH value to 7, drying, pulverizing and granulating. By treating with phosphoric acid, while neutralizing alkalinity, it also introduces nutrients such as phosphorus, which is more economical and environmentally friendly.

In a second embodiment of the present disclosure, a biomechanical pulp and/or fertilizer prepared by the method described in above technical schemes are provided. The fibers in the biomechanical pulp are staggered uniformly and soft with a relatively long and uniform length. It is verified by the subsequent experiments that the paper-based material prepared from the biomechanical pulp has high bursting strength, tearing resistance and ring crush index, and is suitable for unbleached packaging sack paper. At the same time, the fertilizer prepared by the present disclosure is a biomass compound fertilizer, which has been verified by experiments to have better fertilizer efficiency and storage stability.

In a third embodiment of the present disclosure, an application of the biomechanical pulp in the preparation of sack paper and/or an application of the fertilizer in promoting the growth of crops are provided.

In order to enable those skilled in the art to understand the technical schemes of the present disclosure more clearly, the technical schemes of the present disclosure will be described in detail below in conjunction with specific embodiments.

Example 1: A method for preparing an unbleached biomechanical pulp and fully utilizing by-products by treating wheat straws with heat steam in synergy with biological enzyme, an unbleached biomechanical pulp prepared by the method, and a biomass composite fertilizer prepared by the method.

(1) The physically selected dedusted air-dried wheat straw was cut into a ready-for-use raw material with a length of 5 cm, placed in a processor or reactor, mixed according to a liquor ratio of 1:5 (g/mL), a trace amount of KOH was added to the mixture to adjust the pH value of the wheat straw suspension to 14, and then the rotten leaves and straw that cannot be processed and used were collected;

(2) The hot water steam with a temperature of 110° C. was introduced for 20 min to dissolve out some hemicellulose, lignin, pectin and other substances from the wheat straw, the wheat straw was softened by hydrothermal saturation, at the end of the treatment, the pH value of the softened wheat straw containing water was 8, and the lye wastewater was collected;

(3) The wheat straw softened by hydrothermal saturation was rubbed in a TSP360 straw rubbing filament machine, the pressure of the rubbing filament machine was adjusted to make wheat straw have a uniform and good fibrillating effect; and the wastewater generated in the straw rubbing stage was collected;

Process conditions of straw rubbing: the pressure of straw rubbing was 1:3.

(4) The softened and fibrillated wheat straw was treated with alkaline biological compound enzyme in a biological processor or reactor at 50° C. for 50 min, the liquor ratio was controlled at 1:6 (g/mL), the wheat straw was constantly stirred and mixed to make the wheat straw and the biological enzymes fully reacted to further soften the wheat straw fiber;

The alkaline biological compound enzyme was a compound enzyme of alkaline xylanase, alkaline cellulase, and alkaline pectinase, and the total dosage was 50 IU/mL (50 IU biological enzyme in 1 mL liquid), the ratio of enzyme activity of the alkaline xylanase, alkaline cellulase and alkaline pectinase was 4:2:1.5, and the wastewater generated in the enzyme treatment stage was collected;

(5) The wheat straw treated with biological compound enzyme was refined in two stages by a refiner to make the beating degree at 42° SR;

The refining process conditions were: using a KPF series high-concentration disc refiner for high-concentration refining with a spindle speed of 3000 r/min, and a refining gap of 0.3 mm; and the wastewater generated in the enzyme treatment stage was collected.

(6) The refined wheat straw biomechanical pulp was defibrated by a defibrator and mixed evenly to make a 60 g/m² unbleached sack paper on a paper sheet former. All physical indicators have reached the requirements for the production of unbleached packaging paper and paper-based materials.

The lye wastewater, wastewater generated in the straw rubbing stage, wastewater generated in the enzyme treatment stage, and washing water of refining were mixed according to a mass ratio of 10:3:20:10, then evaporated and concentrated by a multi-purpose evaporator to obtain a residue, and the heat energy was recovered for the hot water steam treatment of step (1); the residue was mixed with the rotten leaves and straw that cannot be processed and used in step (1) according to a ratio of 4:1, then phosphoric acid was added to adjust the pH value to 7, and the resulting mixture was dried, pulverized and granulated to obtain a biomass composite fertilizer.

Example 2: A method for preparing an unbleached biomechanical pulp and fully utilizing by-products by treating wheat straws with heat steam in synergy with biological enzyme, an unbleached biomechanical pulp prepared by the method, and a biomass composite fertilizer prepared by the method.

(1) The physically selected dedusted air-dried wheat straw was cut into a ready-for-use raw material with a length of 4 cm, placed in a processor or reactor, mixed according to a liquor ratio of 1:4 (g/mL), a trace amount of KOH was added to the mixture to adjust the pH value of the wheat straw containing water to 14, and then the rotten leaves and straw that cannot be processed and used were collected;

(2) The hot water steam with a temperature of 100° C. was introduced for 30 min to dissolve out some hemicellulose, lignin, pectin and other substances from the wheat straw, the wheat straw was softened by hydrothermal saturation, at the end of the treatment, the pH value of the softened wheat straw containing water was 9, and the lye wastewater was collected.

(3) The wheat straw softened by hydrothermal saturation was rubbed in a TSP360 straw rubbing filament machine, the pressure of the rubbing filament machine was adjusted to make wheat straw have a uniform and good fibrillating effect; and the wastewater generated in the straw rubbing stage was collected;

Process conditions of straw rubbing: the pressure of straw rubbing was 1:4.

(4) The softened and fibrillated wheat straw was treated with alkaline biological compound enzyme in a biological processor or reactor at 55° C. for 60 min, the liquor ratio was controlled at 1:5 (g/mL), the wheat straw was constantly stirred and mixed to make the wheat straw and the biological compound enzymes fully reacted to further soften the wheat straw fiber.

The alkaline biological compound enzyme was a compound enzyme of alkaline xylanase, alkaline cellulase, and alkaline pectinase, and the total dosage was 60 IU/mL, the ratio of enzyme activity of the alkaline xylanase, alkaline cellulase and alkaline pectinase was 4:3:1.5, and the wastewater generated in the enzyme treatment stage was collected;

(5) The wheat straw treated with enzyme was refined to make the beating degree at 45° SR;

The refining conditions were: using a KPF series high-concentration disc refiner for high-concentration refining in two stages with a spindle speed of 3000 r/min, and a refining gap of 0.2 mm; and the wastewater generated in the enzyme treatment stage was collected.

(6) The refined wheat straw biomechanical pulp was defibrated by a defibrator and mixed evenly to make an 80 g/m² unbleached sack paper on a paper sheet former, and the physical strength was tested. All physical indicators have reached the requirements for the production of unbleached packaging paper and paper-based materials.

The lye wastewater, wastewater generated in the straw rubbing stage, wastewater generated in the enzyme treatment stage, and washing water of refining were mixed according to a mass ratio of 15:1:20:15, then evaporated and concentrated by a multi-purpose evaporator to obtain a residue, and the heat energy was recovered for the hot water steam treatment of step (1); the residue was mixed with the rotten leaves and straw that cannot be processed and used in step (1) according to a ratio of 5:2, then phosphoric acid was added to adjust the pH value to 7, and the resulting mixture was dried, pulverized and granulated to obtain a biomass composite fertilizer.

Example 3: A method for preparing an unbleached biomechanical pulp and fully utilizing by-products by treating wheat straws with heat steam in synergy with biological enzyme, an unbleached biomechanical pulp prepared by the method, and a biomass composite fertilizer prepared by the method (1) The physically selected dedusted air-dried wheat straw was cut into a ready-for-use raw material with a length of 6 cm, placed in a wheat straw processor or reactor, mixed according to a liquor ratio of 1:6 (g/mL), a trace amount of KOH was added to the mixture to adjust the pH value of the wheat straw containing water to 13, and then the rotten leaves and straw that cannot be processed and used were collected;

(2) The hot water steam with a temperature of 110° C. was introduced for 20 min to dissolve out some hemicellulose, lignin, pectin and other substances from the wheat straw, the wheat straw was softened by hydrothermal saturation, at the end of the treatment, the pH value of the softened wheat straw containing water was 8, and the lye wastewater was collected.

(3) The wheat straw softened by hydrothermal saturation was straw rubbed in a TSP360 straw rubbing filament machine, the pressure of the straw rubbing filament machine was adjusted to make wheat straw have a uniform and good fibrillating effect; and the wastewater generated in the straw rubbing was collected;

Process conditions of straw rubbing: the pressure of straw rubbing was 1:3.

(4) The softened and fibrillated wheat straw was treated with alkaline biological compound enzyme in a biological processor or reactor at 50° C. for 90 min, the liquor ratio was controlled at 1:5 (g/mL), the wheat straw was constantly stirred and mixed to make the wheat straw and the biological compound enzymes fully reacted to further soften the wheat straw fiber.

The alkaline biological compound enzyme was a compound enzyme of alkaline xylanase, alkaline cellulase, and alkaline pectinase, and the total dosage was 50 IU/mL, the ratio of enzyme activity of the alkaline xylanase, alkaline cellulase and alkaline pectinase was 3:3:1.5, and the wastewater generated in the enzyme treatment stage was collected;

(5) The straw treated with enzyme was refined by a refiner to make the beating degree at 38° SR;

The refining conditions were: using a KPF series high-concentration disc refiner for high-concentration refining in two stages with a spindle speed of 3000 r/min, and a refining gap of 0.25 mm; and the wastewater generated in the enzyme treatment stage was collected.

(6) The refined wheat straw biomechanical pulp was defibrated by a defibrator and mixed evenly to make a 60 g/m² unbleached sack paper on a paper sheet former. All physical indicators have reached the requirements for the production of unbleached packaging paper and paper-based materials.

The lye wastewater, wastewater generated in the straw rubbing stage, wastewater generated in the enzyme treatment stage, and washing water of refining were mixed according to a mass ratio of 12:2:25:15, then evaporated and concentrated by a multi-purpose evaporator to obtain a residue, and the heat energy was recovered for the hot water steam treatment of step (1); the residue was mixed with the rotten leaves and straw that cannot be processed and used in step (1) according to a ratio of 3:1, then phosphoric acid was added to adjust the pH value to 7, and the resulting mixture was dried, pulverized and granulated to obtain a biomass composite fertilizer.

Experimental Example 1: The method is the same as that in Example 1, and the difference is that the biological enzyme after straw rubbing in the TSP360 straw rubbing filament machine is adjusted to a compound enzyme of alkaline xylanase, alkaline cellulase, and alkaline pectinase, the total dosage is 50 IU/mL, and the ratio of enzyme activity of alkaline xylanase, alkaline cellulase, and alkaline pectinase is 2:2:1.5.

Experimental Example 2: The method is the same as that in Example 1, and the difference is that the biological enzyme after straw rubbing in the TSP360 straw rubbing filament machine is adjusted to a compound enzyme of alkaline xylanase, alkaline cellulase, and alkaline pectinase, the total dosage is 50 IU/mL, and the ratio of enzyme activity of alkaline xylanase, alkaline cellulase, and alkaline pectinase is 5:4:1.5.

Experimental Example 3: The method is the same as that in Example 1, and the difference is that the mass ratio of the lye wastewater, wastewater generated in the straw rubbing stage, wastewater generated in the enzyme treatment stage, and washing water of refining is controlled to 5:2:5:10.

Experimental Example 4: The method is the same as that in Example 1, and the difference is that the mass ratio of the lye wastewater, wastewater generated in the straw rubbing stage, wastewater generated in the enzyme treatment stage, and washing water of refining is controlled to 10:1:5:5.

Experimental Example 5: The method is the same as that in Example 1, and the difference is that the mass ratio of the residue to the rotten leaves and straw that cannot be processed and used in step (1) is controlled to 1:1.

Experimental Example 6: The method is the same as that in Example 1, and the difference is that the mass ratio of the residue to the rotten leaves and straw that cannot be processed and used in step (1) is controlled to 6:1.

Effectiveness Verification:

1. Table 1 shows the comparison of the pulping physical properties of biomechanical pulp prepared in Example 1, Experimental Examples 1 and 2. It can be seen that the physical properties of each pulp are better, meeting the requirements for the production of unbleached packaging paper and paper-based materials. The physical properties of pulp in Experimental Example 3-6 are the same as that of Example 1.

TABLE 1

Physical properties of the biomechanical pulp prepared by treating wheat straws with heat steam in synergy with biological enzymes

| method | beating degree/ °SR | bursting strength/ kPa · m · g$^{-1}$ | tearing resistance/ mN · m² · g$^{-1}$ | tensile property/ km | ring crush index/ N · m · g$^{-1}$ |
|---|---|---|---|---|---|
| Example 1 | 44 | 3.21 | 3.68 | 3.15 | 9.86 |
| Experimental Example 1 | 43 | 3.16 | 3.48 | 3.07 | 9.78 |
| Experimental Example 2 | 45 | 3.23 | 3.72 | 3.18 | 9.89 |

2. Fertilizer Efficiency Test of Biomass Compound Fertilizers Prepared in Example 1, and Experimental Examples 1-6

(1) Corn Potting Test

The biomass compound fertilizers prepared in Example 1, Experimental Examples 1-6 were applied to potted corn for experiment, and the biomass compound fertilizer (3 g/kg soil) was applied in the corn seedling stage. The results are shown in Table 2, indicating that compared with the control group CK without fertilization, Example 1 and Experimental Examples 1-6 both increase the corn biomass, and Example 1 has the best effect.

TABLE 2

| example | biomass (g/pot) | increase (%) |
|---|---|---|
| CK | 6.18 | — |
| Example 1 | 7.79 | 26.1 |
| Experimental Example 1 | 6.82 | 10.4 |
| Experimental Example 2 | 7.15 | 15.7 |
| Experimental Example 3 | 7.01 | 13.4 |
| Experimental Example 4 | 6.72 | 8.7 |
| Experimental Example 5 | 6.84 | 9.6 |
| Experimental Example 6 | 7.21 | 16.7 |

(2) Wheat Potting Test

The biomass compound fertilizer prepared in Example 1, Experimental Examples 1-6 were applied to potted wheat for experiment, and the biomass compound fertilizer (5 g/kg soil) was applied at the wheat seedling stage. The results are shown in Table 3, indicating that compared with the control group CK without fertilization, Example 1 and Experimental Examples 1-6 both increase the wheat biomass, and Example 1 has the best effect.

TABLE 3

| example | biomass (g/pot) | increase (%) |
|---|---|---|
| CK | 10.78 | — |
| Example 1 | 13.51 | 25.3 |
| Experimental Example 1 | 11.96 | 10.9 |
| Experimental Example 2 | 12.43 | 13.3 |
| Experimental Example 3 | 12.14 | 12.6 |
| Experimental Example 4 | 11.85 | 10.0 |
| Experimental Example 5 | 12.01 | 11.4 |
| Experimental Example 6 | 12.89 | 19.6 |

3. Storage Stability Test of the Biomass Compound Fertilizers Prepared in Example 1, and Experimental Examples 1-6

For a long time, the problem of blocking has affected the appearance quality of the compound fertilizer and brought inconvenience to the transportation and application of the compound fertilizer. Therefore, the storage stability (anti-blocking performance) of the prepared biomass compound fertilizer was tested by a briquetting method under the condition that the temperature was 50° C., the pressure was 147 N, and the time was 15 d. A 50 g of compound fertilizer sample was placed in the ring, and the shear force data was measured on the cylindrical compound fertilizer briquettes. The test results are shown in Table 4. It can be seen that the storage stability of the biomass compound fertilizer prepared in this application is much higher than that of Experimental Examples 1-6.

TABLE 4

| example | shear force (N) | anti-blocking rate (%) |
| --- | --- | --- |
| Example 1 | 30.82 | 59.1 |
| Experimental Example 1 | 45.96 | 39.0 |
| Experimental Example 2 | 49.75 | 34.0 |
| Experimental Example 3 | 51.27 | 31.9 |
| Experimental Example 4 | 48.29 | 35.9 |
| Experimental Example 5 | 61.56 | 18.3 |
| Experimental Example 6 | 59.86 | 20.5 |

Note:
Anti-blocking rate = (blank shear force − shear force of sample)/blank shear force × 100%, blank shear force is 75.34N.

The above examples are preferred embodiments of the present disclosure, but the embodiments of the present disclosure are not limited to thereto. Any other changes, modifications, replacements, combinations, and simplifications may be made without departing from the spirit and scope of the present disclosure, which are all embraced in the scope of the present disclosure.

What is claimed is:

1. A method for preparing an unbleached biomechanical pulp and fully utilizing by-products by treating wheat straws with heat steam in synergy with biological enzymes, wherein comprising the following steps:
   (1) taking a waste wheat straw after obtaining wheat grains as a raw material, mixing the wheat straw according to a liquor ratio of 1:3-1:8, adding KOH to adjust the pH value of the wheat straw containing water to 10-14, and then introducing hot water steam with a temperature of 100-120° C. for hot water steam treatment for 15-60 min; collecting a lye wastewater, and collecting rotten leaves and straw that cannot be processed and used;
   (2) after the hot water steam treatment, subjecting the wheat straw to straw rubbing and fibrillating; and collecting a wastewater generated in the straw rubbing stage;
   (3) treating the fibrillated wheat straw with alkaline biological compound enzymes at 40-60° C. for 30-90 min; and collecting a wastewater generated in the enzyme treatment stage;
   (4) refining the wheat straw after biological treatment;
   evaporating and concentrating the lye wastewater, the wastewater generated in the straw rubbing stage, the wastewater generated in the enzyme treatment stage, and washing water of refining by a multi-purpose evaporator to obtain a residue, and recovering the heat energy for the hot water steam treatment of step (1); mixing the residue with the rotten leaves and straw that cannot be processed and used in step (1), and adjusting the pH to make a fertilizer;
   wherein in step (4), the mass ratio of the lye wastewater, the wastewater generated in the straw rubbing stage, the wastewater generated in the enzyme treatment stage, and the washing water of refining is 10-15:1-3:20-25:10-15;
   the mass ratio of the residue to the rotten leaves and straw that cannot be processed and used in step (1) is 3-5:1-2;
   the process of adjusting the pH to make the fertilizer is as follows: adding phosphoric acid to adjust the pH value to 7, drying, pulverizing and granulating.

2. The method according to claim 1, wherein in step (1), the waste wheat straw is cut into a ready-for-use raw material having a length of 3-6 cm, and air-dried.

3. The method according to claim 1, wherein in step (1), the pH value of the wheat straw is 7-9 at the end of the treatment.

4. The method according to claim 1, wherein in step (2), a straw rubbing filament machine is used to physically fibrillate, and the process conditions are: the compression ratio of straw rubbing is controlled to 1: 1-1:4.

5. The method according to claim 1, wherein in step (3), the alkaline biological compound enzyme is a compound enzyme of alkaline xylanase, alkaline cellulase, and alkaline pectinase, and the total dosage is 10-60 IU/mL, the ratio of enzyme activity of the alkaline xylanase, alkaline cellulase and alkaline pectinase is (0-5):(0-4):(0-1.5), and the amount of each enzyme is not 0; preferably (3-4):(2-3):1.5; preferably, the total dosage of enzymes is 50-60 IU/mL.

6. The method according to claim 1, wherein in step (4), the number of refining is determined according to production needs, and the beating degree of refining is controlled at 25-50° SR.

7. The method according to claim 1, wherein in step (4), the refining process conditions are: using a KPF series high-concentration disc refiner for high-concentration refining in one or two stages with a spindle speed of 3000-4000 r/min, and a refining gap of 0.15-0.5 mm.

\* \* \* \* \*